United States Patent
Ekström

(10) Patent No.: US 9,301,647 B2
(45) Date of Patent: Apr. 5, 2016

(54) KNIFE FOR A CUTTING DISC FOR A CUTTING MACHINE

(75) Inventor: Ulf Ekström, Täby (SE)

(73) Assignee: AB HALLDE MASKINER, Kista (SE)

( * ) Notice: Subject to any disclaimer, the term of this patent is extended or adjusted under 35 U.S.C. 154(b) by 486 days.

(21) Appl. No.: 13/822,346

(22) PCT Filed: Sep. 7, 2011

(86) PCT No.: PCT/SE2011/051081
§ 371 (c)(1),
(2), (4) Date: Jun. 10, 2013

(87) PCT Pub. No.: WO2012/036614
PCT Pub. Date: Mar. 22, 2012

(65) Prior Publication Data
US 2013/0270378 A1    Oct. 17, 2013

(30) Foreign Application Priority Data

Sep. 13, 2010 (SE) ...................................... 1050946
Jul. 12, 2011 (SE) ...................................... 1150664

(51) Int. Cl.
| | |
|---|---|
| *A47J 43/07* | (2006.01) |
| *B26D 1/00* | (2006.01) |
| *B26D 1/29* | (2006.01) |
| *B26D 7/26* | (2006.01) |

(52) U.S. Cl.
CPC ................ *A47J 43/07* (2013.01); *B26D 1/0006* (2013.01); *B26D 1/29* (2013.01); *B26D 7/2614* (2013.01); *B26D 2001/006* (2013.01)

(58) Field of Classification Search
CPC ................................ A47J 43/046; A47J 43/07
USPC ........................................................... 241/92
See application file for complete search history.

(56) References Cited

U.S. PATENT DOCUMENTS

| | | | | |
|---|---|---|---|---|
| 4,190,208 | A | * | 2/1980 | Schaeffer et al. ............... 241/92 |
| 4,393,737 | A | | 7/1983 | Shibata |
| 2,834,386 | A | | 1/1986 | Gouttebarge |
| 4,601,429 | A | * | 7/1986 | Stottmann et al. .............. 241/92 |
| 5,896,801 | A | | 4/1999 | Jacko |
| 2011/0139017 | A1 | * | 6/2011 | Beber et al. ..................... 99/537 |

FOREIGN PATENT DOCUMENTS

| | | |
|---|---|---|
| DE | 4224428 | 1/1994 |
| GB | 2048655 | 12/1980 |
| WO | 2009/093973 | 7/2009 |

OTHER PUBLICATIONS

International Search Report dated Dec. 15, 2011, corresponding to PCT/SE2011/051081.

* cited by examiner

Primary Examiner — Mark Rosenbaum
(74) Attorney, Agent, or Firm — Young & Thompson

(57) ABSTRACT

A knife for a cutting disc in a cutting machine, which disc includes a centrally arranged, penetrating hole and an opening extending in a radial direction. The disc is manufactured from sheet metal and includes a dike-shaped section with a sloping part extending radially from the center of the disc. An attachment element for attaching the knife is arranged along the sloping part. The knife is bent along a bend line running along the longitudinal direction of the knife. The attachment element is present in a section of the knife on one side of the bend line, and a cutting edge is present running along the free edge of the knife. The angle of bend between the sections is such that the section of the knife at which the cutting edge is present is parallel to the plane of the cutting disc when the knife is mounted on the disc.

16 Claims, 7 Drawing Sheets

PRIOR ART

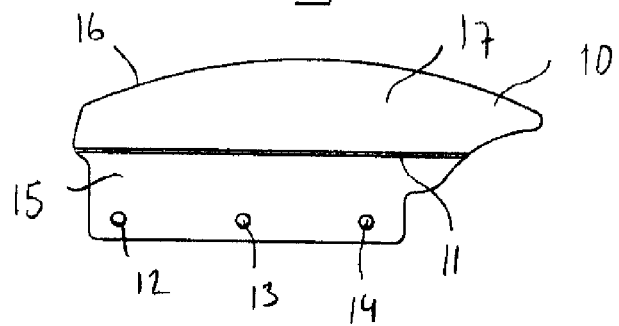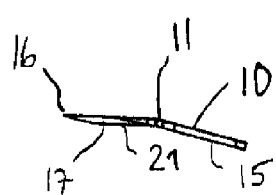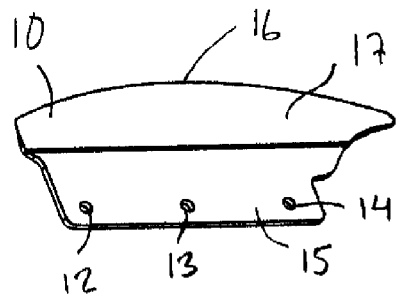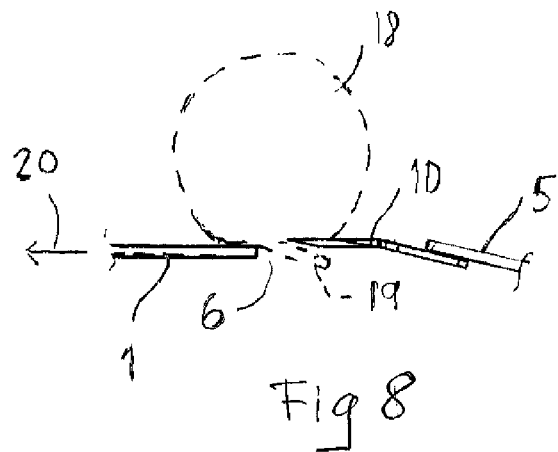

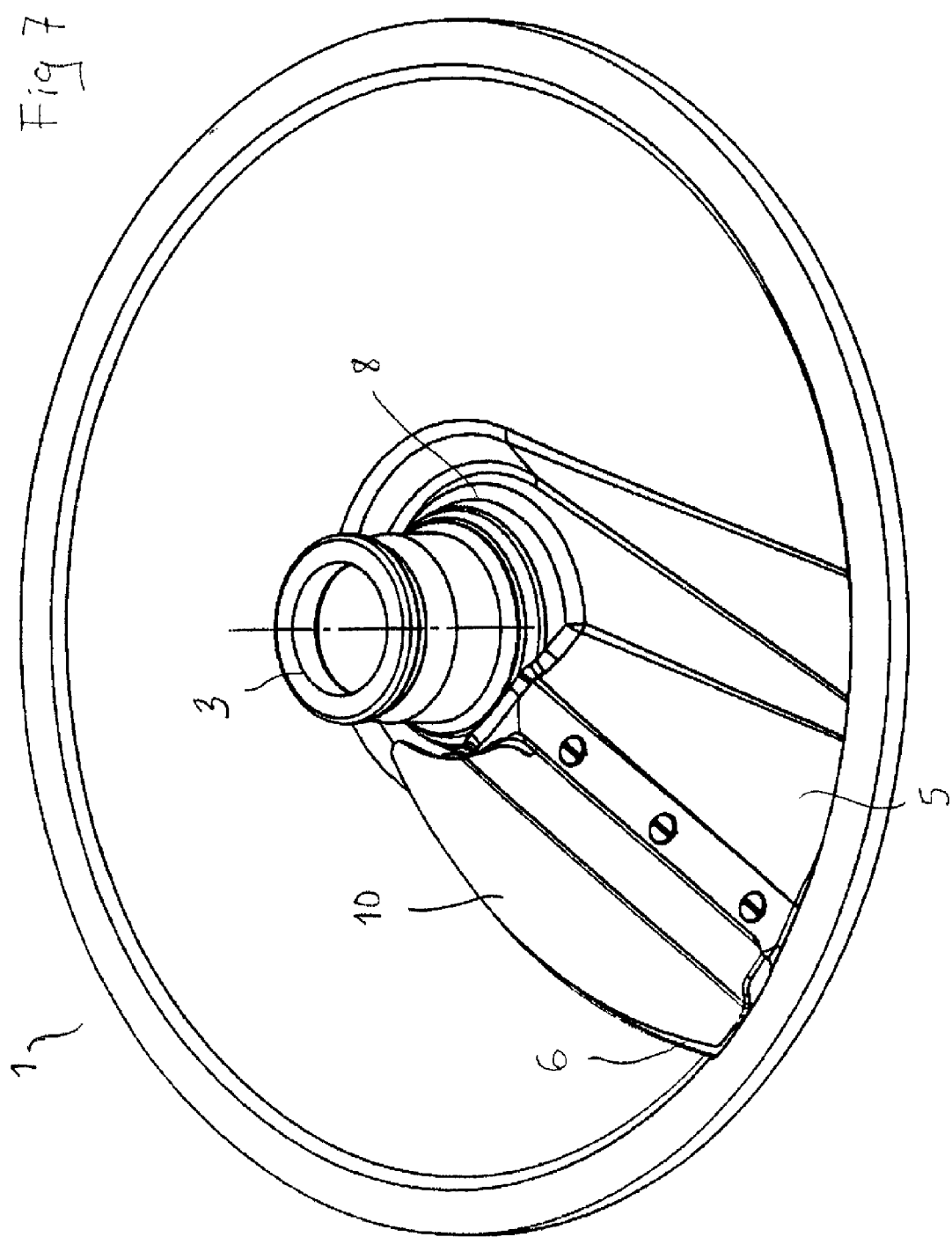

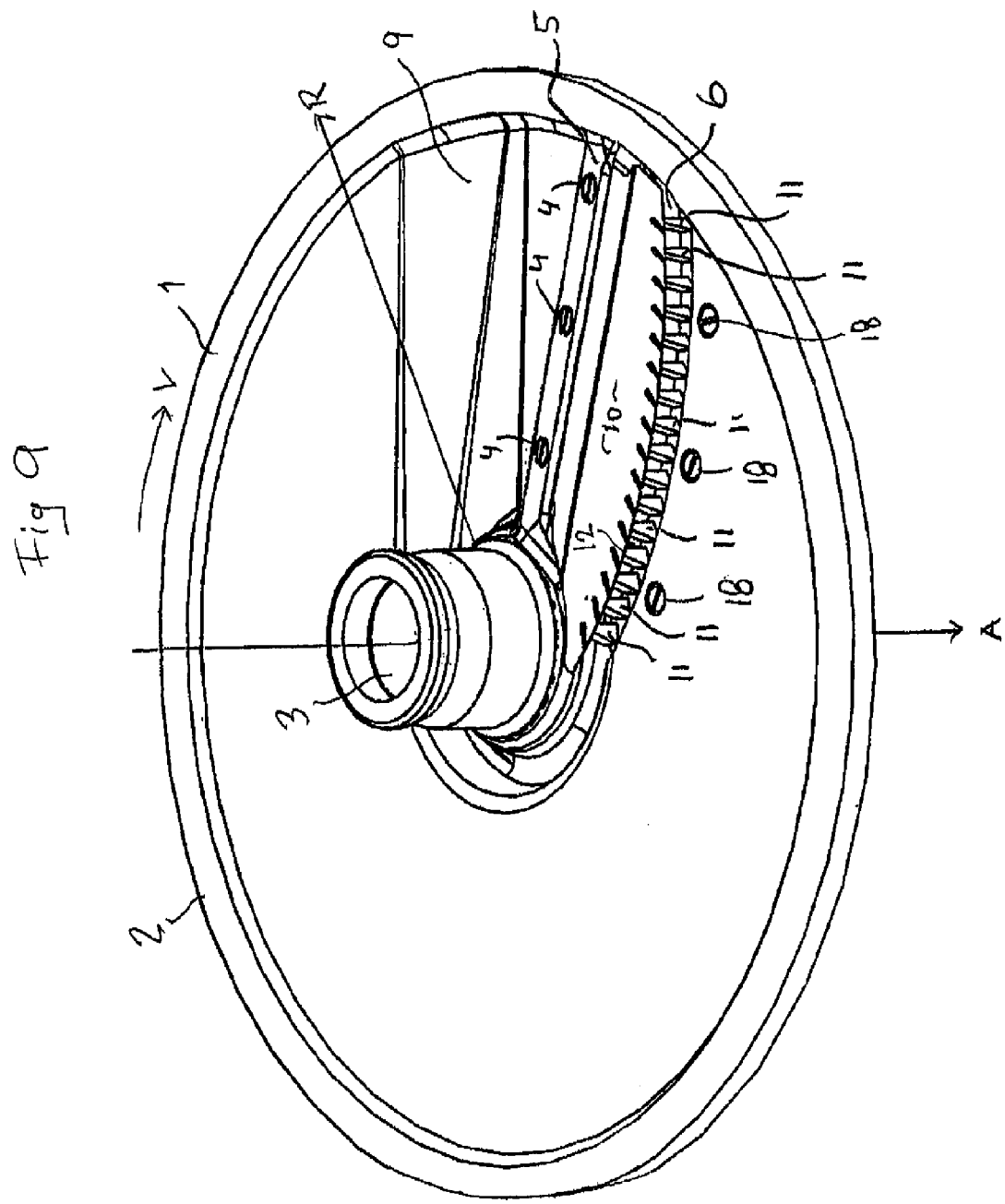

KNIFE FOR A CUTTING DISC FOR A CUTTING MACHINE

BACKGROUND OF THE INVENTION

1. Field of the Invention

The present invention relates to a knife for a cutting disc for a cutting machine, or to be more precise, a vegetable cutter.

A cutting machine is a type of food processor, in which a cutting disc is arranged to rotate, and that is used to cut foodstuffs either in industrial kitchens or the home.

2. Description of the Related Art

Cutting discs that are used in such cutting machines have conventionally been manufactured from die-cast aluminium. However, discs of aluminium tend to become discoloured not only through contact with acids that are present in foodstuffs, but also when being washed in a washing machine. This is undesirable for their use in, for example, industrial kitchens.

Cutting discs are exposed to large forces during their use in cutting machines, including reactive forces from foodstuffs, which are pressed with great force through the cutting part of the cutting machine in which the disc is arranged. Cutting discs must, therefore, possess sufficient stiffness.

The Swedish patent 531916 describes a cutting disc for use in a cutting machine, comprising a centrally arranged, penetrating hole and an opening that extends in a radial direction, and it is characterised in that the cutting disc is manufactured from sheet metal. The cutting disc comprises a first bent edge peripherally arranged around the disc and a second bent edge arranged peripherally around the penetrating hole. Further, the cutting disc comprises a dike-shaped section that extends radially from the centre of the cutting disc and out to the said first bent edge. An opening through the disc is arranged in connection with the dike-shaped part.

In the case in which a removable cutting knife is used, this is fixed in connection to this opening at one of the surfaces that form the dike-shaped section. This results in the knife forming a certain small angle with the plane of the cutting disc. The angle can be, typically, 10-20 degrees.

Such an arrangement means that it is not possible to cut thin slices of certain vegetables without the slices becoming deformed, and in that a slice is cut with an uneven thickness. Such a cutting result is unacceptable.

The present invention solves this problem.

BRIEF SUMMARY OF THE INVENTION

The present invention thus relates to a knife for a cutting disc for use in a cutting machine, which cutting disc is arranged to cut foodstuffs, or arranged for shredding of foodstuffs, which cutting disc comprises a centrally arranged, penetrating hole and an opening that extends in a radial direction, where the cutting disc is manufactured from sheet metal, which disc comprises a first bent edge arranged peripherally around the disc and a second bent edge arranged peripherally around the penetrating hole, and where the disc comprises a dike-shaped section with a sloping part that extends radially from the centre of the cutting disc and out to the said first bent edge, and where an attachment means for the attachment of a cutting device that comprises the said knife is arranged along the sloping part, and it is characterised in that that knife is bent along a bend line that runs along the longitudinal direction of the knife, in that the attachment means for the knife is present in a section of the knife on one side of the bend line and in that a cutting edge is present running along the free edge of the knife at a section of the knife on the other side of the bend line, and in that the angle of bend between the sections is such that the section of the knife at which the cutting edge is present is parallel to the plane of the cutting disc when the knife is mounted on the cutting disc.

BRIEF DESCRIPTION OF THE DRAWINGS

The invention will be described in more detail below with reference to exemplifying embodiments of the invention and to the attached drawings, where:

FIG. 4 is a plan view of a knife according to the invention

FIG. 5 is a side view of a knife according to the invention

FIG. 6 is a perspective view of a knife according to the invention

FIG. 7 is a perspective view of a cutting disc with a knife according to the invention mounted on the cutting disc according to a first embodiment of the invention FIG. 8 is a sketch that illustrates the cutting procedure of the knife FIG. 9 is a perspective view of a cutting disc according to a second embodiment of the invention

DETAILED DESCRIPTION OF THE PREFERRED EMBODIMENTS

Figure 1:
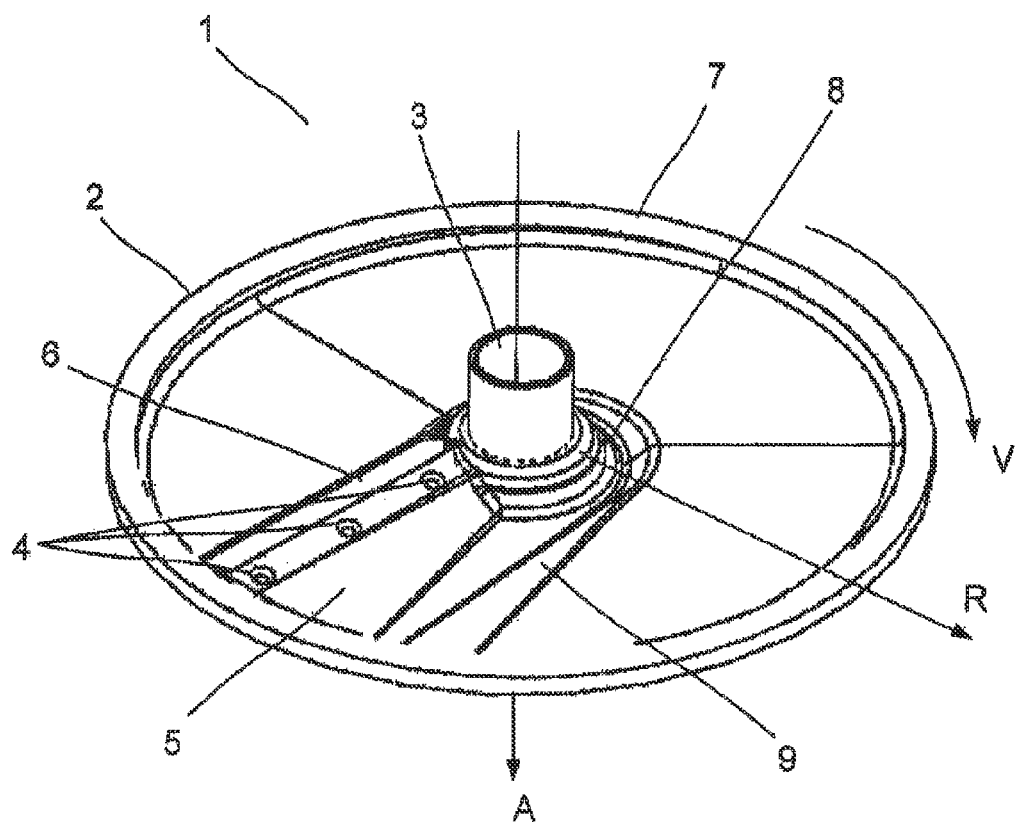
FIG. 1 is a perspective view of a cutting disc
Figure 2:
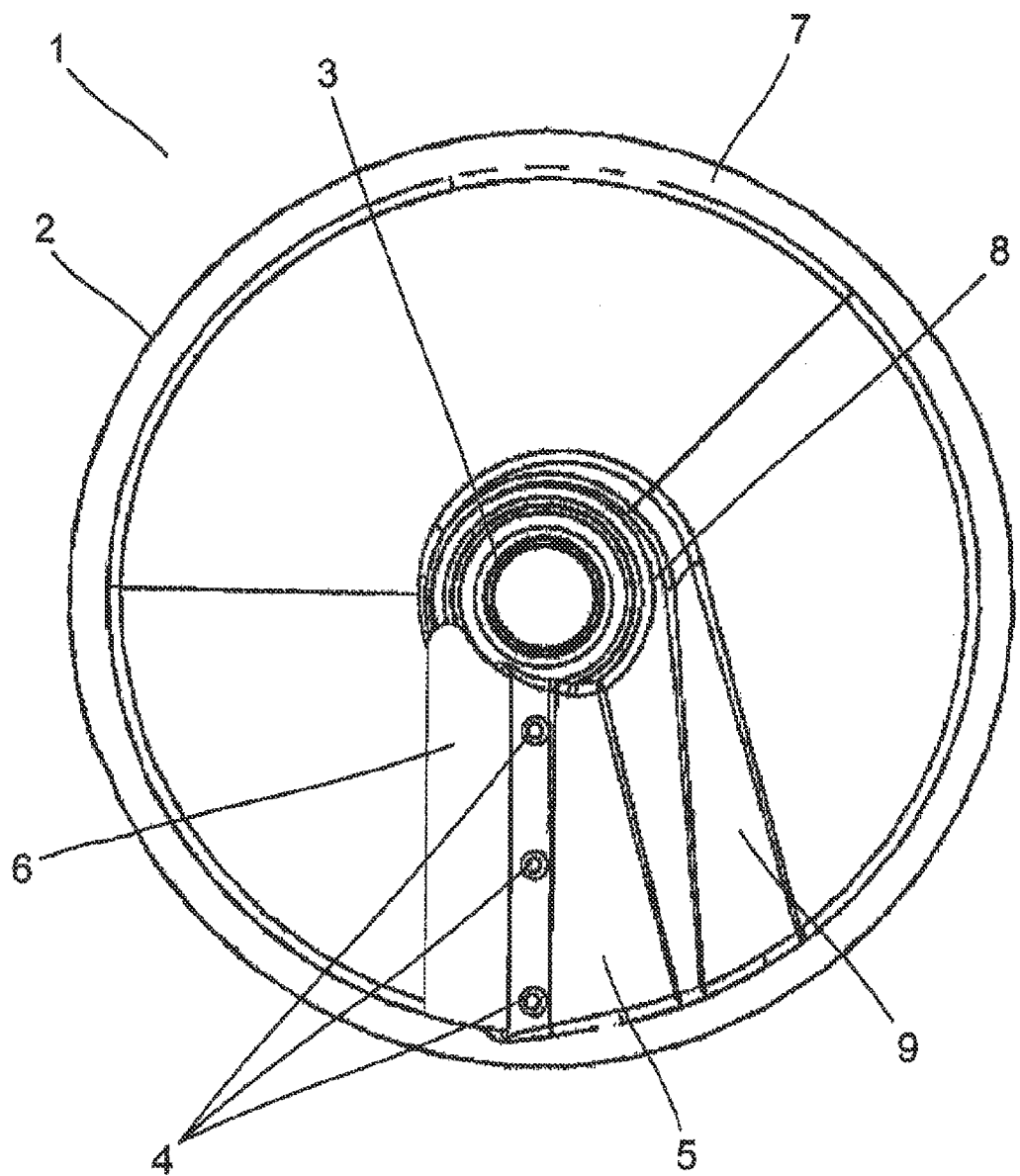
FIG. 2 is a view from above of a cutting disc according to FIG. 1
Figure 3:
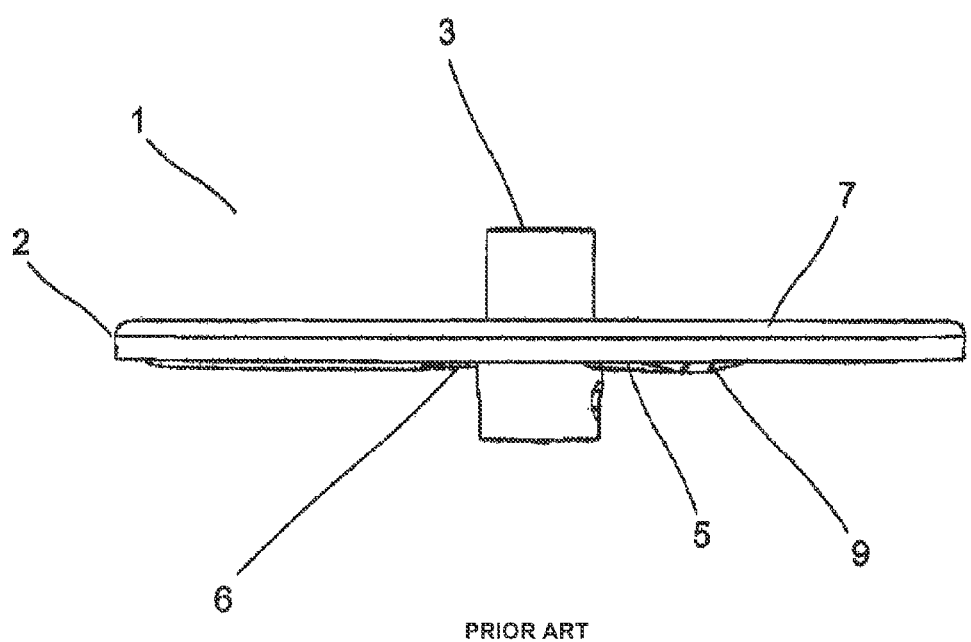
FIG. 3 is a side view of a cutting disc according to FIG. 1
Figure 10:
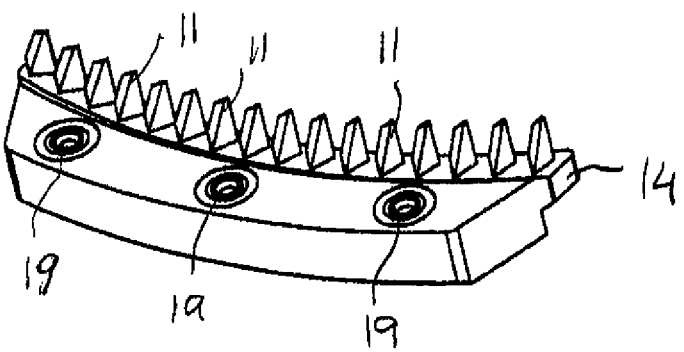
FIG. 10 shows a shredding means which in FIG. 9 is mounted on the cutting disc

FIG. 1 shows a cutting disc 1 according to the Swedish patent 531916, intended for use in a cutting machine. The disc 1 is essentially plane and associated with an axial direction A, an angular direction V and a radial direction R. FIGS. 2 and 3 show two other views of the same cutting disc. The reference numbers are the same in all of these figures.

The disc 1 comprises a peripheral edge 2 that stretches around the axis of the disc 1 in the angular direction V, and a centrally arranged, penetrating hole 3. The dimensions and form of the hole 3 are adapted to be able to engage with the existing attachment for a cutting disc in a known cutting machine (not shown), in which the cutting disc 1 is intended to be used.

The disc 1 further comprises an extended dike-shaped section 5, 9 that extends in a radial direction R out from the hole 3, and which may have, for example, parallel edges or it may essentially have radial symmetry. The dike-shaped section comprises a sloping part 5. An opening 6 is arranged next to the sloping part 5, which opening extends in essentially the radial direction R, and through which opening cut foodstuffs are passed during use of the cutting machine.

A cutting edge is arranged along a free edge of the opening 6 to support an exchangeable cutting device in the form of a blade-formed knife according to the invention. The knife is arranged to be mounted on the cutting disc 1 with the aid of conventional attachment means 4, in the form, for example, of internally threaded holes that are arranged to be able to engage externally threaded screws that are, in turn, arranged to be able to retain the cutting device at the sloping part 5, along a free edge of the sloping part 5.

The sloping part 5 comprises at least one surface section that slopes along the angular direction V of the disc 1, such that a point on the sloping surface section that lies further away from the cutting edge in the angular direction V also is further away from the principal plane of the disc 1 in its axial direction A.

During its use in a cutting machine, the disc rotates around the angular direction V, preferably with a rate of revolution of between 100 and 3000 revolutions per minute. Foodstuffs, such as vegetables, meat, etc., that are to be cut up are fed along the axial direction A in the direction towards the disc 1. The foodstuffs are pressed against the cutting edge due to the rotation of the disc 1, and they are cut by this edge. The cut foodstuff parts are pressed onwards, due to the rotation of the disc 1 in combination with the sloping plane of the sloping part 5, through the opening 6 away from the disc 1 in the axial direction A and onwards towards the collection or outlet arrangement of the cutting machine, or to a subsequent processing stage.

Thus foodstuffs pass through the opening 6 in association with their being cut up by the cutting edge. The opening 6 may be arranged with different heights or widths, depending on the purpose of the cutting disc 1. Different further cutting arrangements, for example, may be arranged along the cutting disc 1 in the processing programme of the cutting machine, and different thickness of the cut up foodstuffs may be desired for this reason. Such considerations are thus reflected in the choice of form and dimensions for the opening 6.

Conventional cutting discs are normally manufactured from cast light metal. The present cutting disc 1 is manufactured from relatively thin sheet rust-free metal, with a thickness between 1 and 2.5 millimeters, preferably approximately 1.5 mm.

The information presented above is presented in the Swedish patent mentioned above.

As has been mentioned above, a conventional knife mounted onto the cutting disc results in the knife forming a certain angle with the plane of the disc, which in turn means that it is not possible to cut thin slices of certain vegetables without the slices becoming deformed, and in that a slice is cut with an uneven thickness.

According to the present invention, the knife 10 is bent along a bend line 11 that runs in the longitudinal direction of the knife. The attachment means of the knife 10, which is constituted by holes 12-14 into which screws that are screwed into the cutting disc 1 run, is located in a section 15 of the knife 10 on one side of the bend line 11. The cutting edge 16 of the knife 10 is located along the free edge of the knife in a section 17 of the knife on the other side of the bend line 11.

According to a highly significant distinctive feature, the angle of bend, i.e. the angle between the two said sections, is such that the section 17 of the knife at which the cutting edge 16 is located is parallel to the plane of the cutting disc 1 when the knife 10 is mounted on the cutting disc. The last mentioned distinctive feature is illustrated in FIG. 8. A part of the plane of the cutting disc 1 is shown in FIG. 8, together with a part of the sloping part 5 at which the knife is attached.

Thus, through this design of the knife, the section 17 of the knife at which the cutting edge is located will be parallel to the uppermost surface of the cutting disc. In this way, a vegetable that is cut will be in contact during the cutting operation with the section 17, which thus constitutes a support for the vegetable, which is pressed from above downwards against the cutting disc of a feed arrangement. A vegetable 18 is shown in FIG. 8 by dashed lines. A partially cut part of the vegetable 18 has been given the reference number 19. The direction of transport of the cutting disc is shown by the arrow 20.

It is possible, through the design of the knife here described, to cut thin slices of certain vegetables, for example tomatoes, without the slices becoming deformed and without a slice being cut with an uneven thickness. In contrast, the slices will be of equal thickness also when soft vegetables are cut. Furthermore, it is possible to cut thin slices.

It is preferred that the said sections 15, 17 of the knife on the two sides of the bend line 11 are plane.

It is furthermore preferred that the knife 10 be manufactured from stainless steel.

According to one preferred embodiment, the knife 10 is arranged to be in contact with and to be attached to the lower surface of the sloping part 5.

According to a second preferred embodiment, the cutting edge 16 of the knife 10 has been ground such that the grinding is present only at the lower surface 21 of the knife 11 when the knife is mounted on the cutting disc.

According to another embodiment of the invention, in case the cutting disc is arranged for shredding of foodstuffs, fastening means are arranged for fastening of a shredding means comprising a plurality of knives. The shredding means is arranged to cooperate with said knife such that the foodstuffs are cut in two mutually perpendicular planes. This embodiment is characterized in that the knives of the shredding means extend perpendicularly or essentially perpendicularly to the edge of the first knife in said opening at the part of the first knife where the edge is arranged.

A fastening means 4 for fastening of a cutting means comprising a first knife 10 is arranged along the inclined part 5. Furthermore, there are fastening means 18, 19 arranged for fastening of said shredding means 14 comprising a plurality of parallel knives 11.

Hereby, the first knife will cut off foodstuffs which are fed towards and against the knife by the rotating cutting disc and immediately thereafter the knives 11 of the shredding means 14 will split the cut-off foodstuffs in parallel shreds. The shreds will thereafter pass through the opening 6.

According to the said embodiment of the invention, the parallel-arranged knives of the shredding means run perpendicularly to the edge of the first knife in the said opening at the part of the first knife in which the edge is arranged.

Figure 11:
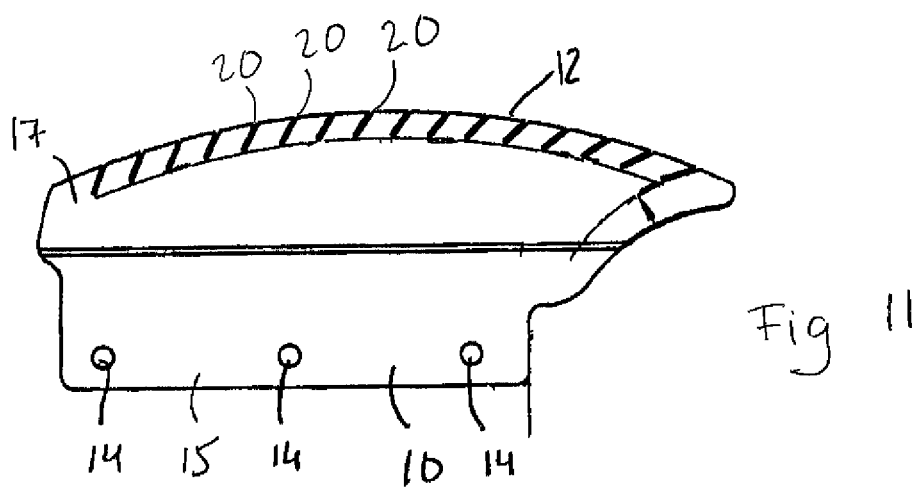
FIG. 11 is a top view of the knife of the cutting disc according to the invention
Figure 12:
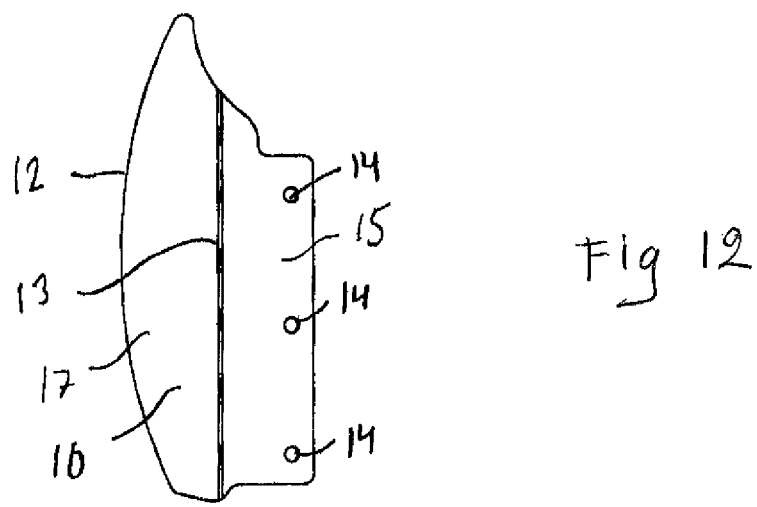
FIG. 12 is a simplified top view of a knife according to FIG. 11
Figure 13:
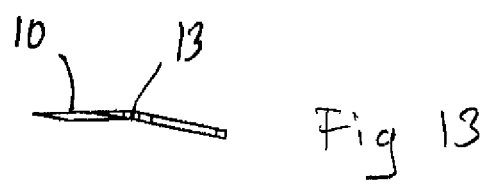
FIG. 13 is a side view of a knife according to said second embodiment.

As can be seen in FIG. 11 the knife 10 is provided with narrow slots 20 into which the upper part of the shredding knives are entered in order to stabilize the shredding knives.

Because of this design of the knife, the part 17 of the knife in which the edge is arranged will thus be parallel to the upper surface of the cutting disc. Hereby, a vegetable which is cut will, during the cutting, abut against the part 17 which thereby constitutes a support for the vegetable, which is pressed downwards from above against the cutting disc by a feeding device.

Because of the described embodiment of the first knife and the shredding means 14, shreds are cut away with a square or rectangular cross-section and with constant thickness along their length. Also, the shreds can be made thin.

A number of preferred embodiments have been described above. It is, however, obvious for one skilled in the arts that many changes can be made to the embodiments described, without deviating from the innovative concept of the invention. Thus, the invention is not to be limited by the embodiments described but can be varied within the scope of the attached patent claims.

The invention claimed is:

1. A knife in combination with a cutting disc (1) for use in a cutting machine, which cutting disc is arranged to cut foodstuffs, or arranged for shredding of foodstuffs, which cutting disc comprises a centrally arranged, penetrating hole (3) and an opening (6) that extends in a radial direction, and where the cutting disc (1) is manufactured from sheet metal, which disc comprises a first bent edge (7) arranged peripherally around the disc (1) and a second bent edge (8) arranged peripherally around the penetrating hole (3), and where the disc comprises a dike-shaped section (5, 9) with a sloping part (5) that extends radially from the centre of the cutting disc (1) and out to said first bent edge (7), and where an attachment means (4) for the attachment of a cutting device that comprises said knife (10) is arranged along the sloping part (5), wherein the knife (10) is bent along a bend line (11) that runs along the longitudinal direction of the knife, the attachment means (12-14) for the knife (10) is present in a section (15) of the knife on one side of the bend line (11) and a cutting edge (16) is present running along the free edge of the knife at a section (17) of the knife on the other side of the bend line (11), and the angle of bend between the sections is such that the section (17) of the knife at which the cutting edge (16) is present is parallel to the plane of the cutting disc (1) when the knife (10) is mounted on the cutting disc.

2. The knife in combination with the cutting disc according to claim 1, wherein said sections (15, 17) of the knife (10) on the two sides of the bend line (11) are plane.

3. The knife in combination with the cutting disc according to claim 2, wherein the knife (10) is manufactured from stainless steel.

4. The knife in combination with the cutting disc according to claim 2, wherein the knife (10) is arranged to be in contact with and attached to the lower surface of the sloping part (5) of the cutting disc (1).

5. The knife in combination with the cutting disc according to claim 2, wherein the cutting edge (16) of the knife (10) is ground such that the grinding is present at the lower surface (21) of the knife when the knife is mounted on the cutting disc (1).

6. The knife in combination with the cutting disc according to claim 2, wherein the cutting disc (1) is arranged for shredding of foodstuffs, where fastening means (18,19) are arranged for fastening of a shredding means (14) comprising a plurality of knives, which shredding means is arranged to cooperate with said knife (10) such that the foodstuffs are cut in two mutually perpendicular planes, and the knives (11) of the shredding means extend perpendicularly or essentially perpendicularly to the edge (12) of the first knife in said opening (6) at the part (17) of the first knife where the edge (12) is arranged.

7. The knife in combination with the cutting disc according to claim 1, wherein the knife (10) is manufactured from stainless steel.

8. The knife in combination with the cutting disc according to claim 7, wherein the knife (10) is arranged to be in contact with and attached to the lower surface of the sloping part (5) of the cutting disc (1).

9. The knife in combination with the cutting disc according to claim 7, wherein the cutting edge (16) of the knife (10) is ground such that the grinding is present at the lower surface (21) of the knife when the knife is mounted on the cutting disc (1).

10. The knife in combination with the cutting disc according to claim 7, wherein the cutting disc (1) is arranged for shredding of foodstuffs, where fastening means (18,19) are arranged for fastening of a shredding means (14) comprising a plurality of knives, which shredding means is arranged to cooperate with said knife (10) such that the foodstuffs are cut in two mutually perpendicular planes, and the knives (11) of the shredding means extend perpendicularly or essentially perpendicularly to the edge (12) of the first knife in said opening (6) at the part (17) of the first knife where the edge (12) is arranged.

11. The knife in combination with the cutting disc according to claim 1, wherein the knife (10) is arranged to be in contact with and attached to the lower surface of the sloping part (5) of the cutting disc (1).

12. The knife in combination with the cutting disc according to claim 11, wherein the cutting edge (16) of the knife (10) is ground such that the grinding is present at the lower surface (21) of the knife when the knife is mounted on the cutting disc (1).

13. The knife in combination with the cutting disc according to claim 11, wherein the cutting disc (1) is arranged for shredding of foodstuffs, where fastening means (18,19) are arranged for fastening of a shredding means (14) comprising a plurality of knives, which shredding means is arranged to cooperate with said knife (10) such that the foodstuffs are cut in two mutually perpendicular planes, and the knives (11) of the shredding means extend perpendicularly or essentially perpendicularly to the edge (12) of the first knife in said opening (6) at the part (17) of the first knife where the edge (12) is arranged.

14. The knife in combination with the cutting disc according to claim 1, wherein the cutting edge (16) of the knife (10) is ground such that the grinding is present at the lower surface (21) of the knife when the knife is mounted on the cutting disc (1).

15. The knife in combination with the cutting disc according to claim 14, wherein the cutting disc (1) is arranged for shredding of foodstuffs, where fastening means (18,19) are arranged for fastening of a shredding means (14) comprising a plurality of knives, which shredding means is arranged to cooperate with said knife (10) such that the foodstuffs are cut in two mutually perpendicular planes, and the knives (11) of the shredding means extend perpendicularly or essentially perpendicularly to the edge (12) of the first knife in said opening (6) at the part (17) of the first knife where the edge (12) is arranged.

16. The knife in combination with the cutting disc according to claim 1, wherein the cutting disc (1) is arranged for shredding of foodstuffs, where fastening means (18,19) are arranged for fastening of a shredding means (14) comprising a plurality of knives, which shredding means is arranged to cooperate with said knife (10) such that the foodstuffs are cut in two mutually perpendicular planes, and the knives (11) of the shredding means extend perpendicularly or essentially perpendicularly to the edge (12) of the first knife in said opening (6) at the part (17) of the first knife where the edge (12) is arranged.

* * * * *